US007057641B2

(12) United States Patent
Bodnar et al.

(10) Patent No.: US 7,057,641 B2
(45) Date of Patent: Jun. 6, 2006

(54) METHOD FOR USING AN ELECTRONIC IMAGING DEVICE TO MEASURE COLOR

(75) Inventors: Gary Bodnar, Springboro, OH (US); Christopher Pearson, Springboro, OH (US); Karl F. Seibert, Kettering, OH (US); Michael J. Vrhel, Redmond, WA (US)

(73) Assignee: Color Savvy Systems Limited, Springboro, OH (US)

( * ) Notice: Subject to any disclaimer, the term of this patent is extended or adjusted under 35 U.S.C. 154(b) by 0 days.

(21) Appl. No.: 10/736,449

(22) Filed: Dec. 15, 2003

(65) Prior Publication Data

US 2004/0179101 A1 Sep. 16, 2004

Related U.S. Application Data

(60) Provisional application No. 60/433,293, filed on Dec. 13, 2002.

(51) Int. Cl.
*H04N 17/00* (2006.01)

(52) U.S. Cl. .................................................. 348/188
(58) Field of Classification Search ................ 348/188, 348/187, 223, 225, 227; H04N 17/00
See application file for complete search history.

(56) References Cited

U.S. PATENT DOCUMENTS

| 4,991,007 A | 2/1991 | Corley |
| 5,371,538 A | 12/1994 | Widger |
| 5,760,829 A | 6/1998 | Sussmeier |

FOREIGN PATENT DOCUMENTS

| JP | 05289206 A | * 11/1993 |
| JP | 2002190959 A | * 7/2002 |

* cited by examiner

*Primary Examiner*—Michael H. Lee
(74) *Attorney, Agent, or Firm*—Thompson Hine LLP

(57) ABSTRACT

A color measurement device comprising a means for electronically recording a digital color image, a target holder extending from the recording means having a distal end, and a target at the distal end of the holder, the target having one or more reference color regions thereon.

17 Claims, 3 Drawing Sheets

METHOD FOR USING AN ELECTRONIC IMAGING DEVICE TO MEASURE COLOR

CROSS REFERENCE TO RELATED APPLICATION

This application claims priority to U.S. Provisional Application Ser. No. 60/433,293 as filed on Dec. 13, 2002.

FIELD OF THE INVENTION

This invention is an image-capturing device and a method which allows an electronic image-capturing device to be used to measure the color of an object.

SUMMARY OF THE INVENTION

An electronic image capture device (typically a digital camera) captures an image of a target area on an object along with reference colors that have been placed in its field of view in close proximity to the target area. Software analyzes the pixels of the output image. By comparing the reference colors as captured by the imaging device to their known values, a "real-time" profile that describes the color behavior characteristics of the imaging device is calculated, color corrections are then calculated for that particular image environment, and the true color of the target object can be determined independently of the state of the imaging device and the ambient lighting conditions.

In one embodiment of the invention skin color, e.g., on a human face is measured to assist in the selection of cosmetic products. The device is placed against the skin and an image of the target area is captured along with an image of the reference colors. Software analyzes the pixels in the image and makes the necessary calculations to determine the color of the target area based on the reference colors. In a more specific embodiment, software may be provided that compares this measurement with measurements in its internal, pre-loaded reference set of makeup color options to identify the makeup product with the best color match.

In another embodiment of the invention a digital image of hair is procured to identify its current color and aid in selecting formulas to re-color it. The targeting mechanism containing reference colors is placed against the hair and an image of the target area is captured along with reference colors. Software analyzes the pixels in the image, including a calculation to factor out the effect of ambient light, and makes the necessary calculations to determine the color of the target area. In a more specific embodiment, software is provided that uses that information to recommend coloring products and processes to achieve a target color, or to simulate the result when a particular product and process are applied to the existing hair.

DETAILED DESCRIPTION

Figure 1:
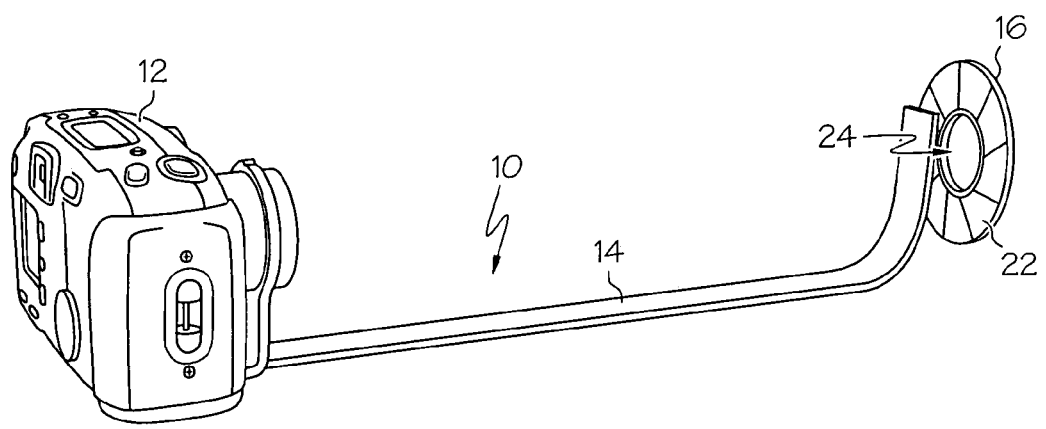
FIG. 1 is a perspective view of an image capturing device in accordance with one embodiment of the present invention.

FIG. 1 illustrates a measurement device 10 useful to capture an image of a set of reference colors and a sample of a color for which a measurement is desired (target region) in one embodiment of this invention. After the image is captured, it is processed using previously determined data for the reference colors to determine values for the color of the target region.

The measurement device 10 in accordance with the present invention includes an image capture device 12, such as a digital camera, a digital imaging chip such as a color CMOS or CCD sensor or a monochrome sensor with external color filters, a target holder 14 that extends a predetermined distance from the camera 12, and a target 16. The length of the target holder 14 will be a convenient length to focus the target within the field of the lens. For many applications the holder will be 10 to 18 inches long. The target 16 may assume any of various configurations. Although any color digital image capture device may be used, the preferred device is a still camera with at least 240×320 resolution. In the illustrated embodiment, the target is a ring having at least one reference color on the surface of the ring that faces the camera 12. Reference colors can be presented as a "doughnut-shaped" ring (see FIG. 2) with color segments that are attached or printed in a manner that ensures their color stability. The target holder positions the ring such that it is in the camera's field of view and the area targeted for measurement appears in the center of the ring. This configuration is illustrated in more detail in FIG. 2. Preferably, the target is configured such that in the imaging device's field of view will be both a set of reference colors and the target area of which a color measurement is desired. The layout of the reference colors can be any shape as long a they are in the imaging device's field of view, and any size, as long as the imaging device can capture enough pixels to develop a satisfactory average reading. Typically an average reading based on 10 or 20 pixels is sufficient, but it depends on the specific imaging device selected. The target is preferably configured so that the reference colors are placed as close as possible to the measurement target region, paying particular attention to keep the plane of the reference colors as close to the plane of the measurement target region. C-shaped, U-shaped, and linear arrays of reference and target areas are feasible. Keeping the total imaged area as small as possible helps to ensure that all illumination of all of the regions will be consistent.

The camera and reference color set can be packaged in several hand-held configurations to facilitate capturing an image of the target area. In one configuration, (a "closed" configuration) a light source may be provided to illuminate the target. In an "open" configuration, no independent light source is provided and ambient light provides the necessary illumination. The device's controller, when commanded to take a reading, will activate illumination, if the application is so equipped, capture the image, and then deactivate the illumination. The controller performs the analysis and corrections of the image and then reports the result of the color measurement according to the requirements of the application.

The "stand-alone" configuration would include a processor that controls image capture and processes the resulting image and also includes any of a variety of display and I/O components (e.g., LCD, touchscreen, keyboard, etc.) integrated into a single package with either an external power source or a provision for internal batteries for power. A "peripheral" configuration would only include the image capture components, and all processing would be in a separate package with any of several forms of interconnection (wired, rf, ir, etc.)

Figure 2:
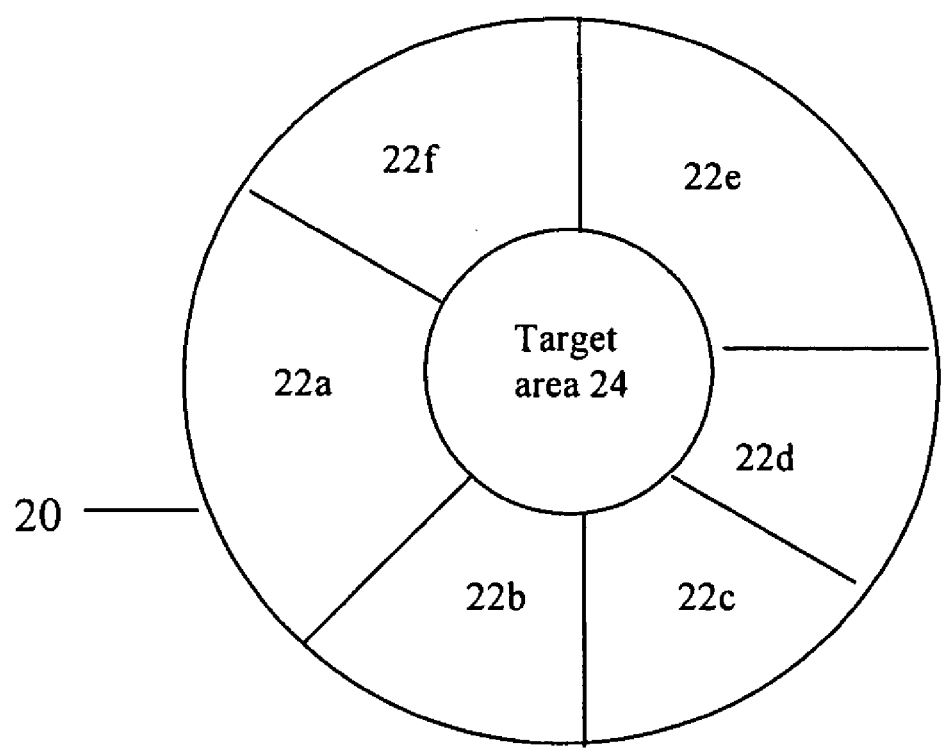
FIG. 2 is a schematic illustration of a target configuration useful in one embodiment of the invention.

As shown in FIG. 2 the annular ring 20 contains (in this case) six segments 22a–22f of reference colors, and has an opening 24 in the center through which the imaging device will see the target area 24.

To take a measurement, the device is situated such that the color target to b measured is positioned in the imaging device's field of view and in the measurement target region. The number of reference colors can vary and depend on the desired level of accuracy in the color measurement of the target. As few as one reference color may be used. However, the greater the number of reference colors used, the greater the final accuracy will be. In general, reference colors should be selected to be as different as possible so as to represent the largest range of colors. If the target colors to be measured are in a known range, (e.g. skin tones) the samples would ideally cover the full range of possible skin tones. If the target colors are hair colors, the reference colors preferably will cover the range of hair colors.

The imaging device captures the image of the target area and the reference colors as a matrix of pixels. Each pixel is assigned as x-y coordinate. A table identifies the pixel coordinates that are within each reference color region and the coordinates of the target area to be measured.

Color measurements of the reference colors establish a standard benchmarkk for the imaging device and the illumination conditions. Reference values for each color are used to correct for changes in the imaging device and illumination conditions to ensure consistent, accurate measurements.

Figure 3:
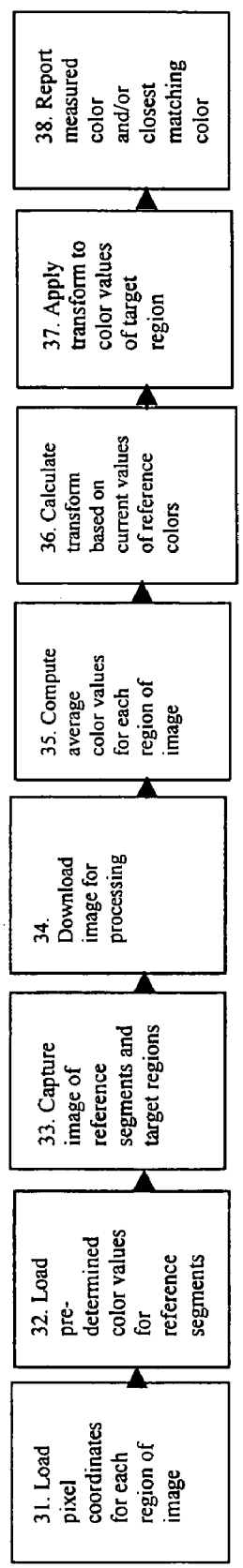
FIG. 3 is a flow chart illustrating the process for determining a color measurement from a digital image.

A flowchart illustrating one process in accordance with the invention is shown in FIG. 3. The color values may be expressed in any standard color space (e.g., CIE XYZ RGB) accordance with the embodiment illustrated in FIG. 3, pixel coordinates are provided for each region of the target image. In FIG. 2, the target image includes regions 22a–22f and the target area 24. Cooordinates for each of these regions are either provided with the software or entered by the user depending upon the sophistication of the program and the user, as indicated by box 31 in the flowchart. Similarly, the reference color values are provided. Again, these values may be pre-programmed into the software or they may be entered by the user as indicated in box 32 of the flowchart. Furthermore, if one device is used to measure both skin tone and hair color, it may be desired to construct the target ring 16 such that the reference colors can be changed. In this case, the user would enter the color values corresponding to the reference colors which the user employs in the target ring at the time. Embodiments are envisioned, for example, in which, for measuring blonde or sandy colored hair a first set of reference colors is used and for measuring darker hair colors, a second set of reference colors is used. If the system is designed with this flexibility, the user will have to enter the reference values or select the reference values from a menu for use in the process.

Process step 33 triggers the imaging device to capture an image of the reference colors and the target area for which a color measurement is desired. The imaging device will typically generate a matrix of red, green, and blue (RGB) pixel points that represent the intensity of each of these colors at that point of the target image. In step 34 the pixel matrix captured by the imaging device 12 is loaded into memory for further processing.

In step 35 a simple mathematical average reading for each one of the color regions (both reference and target) is computed. An average reading is used to correct for anomalies in the imaging device, uneven illumination, etc. For example, the average value for the R, G, and B values would be computed over each region of interest, resulting in a single set of values that represent the color of the region. Further averaging can be achieved by using multiple captures of the reference and target colors with or without further color filtering. While it is desirable to use an average reading for each of the color regions, those skilled in the art will appreciated that it is not essential. Less accurate devices can employ a single reading from each of the regions. If the embodiment contains an integral light source, a further refinement would be to capture an image with out the illumination and subtract that from the image(s) with illumination to correct for any dark current.

In step 36, a transformation "B" is calculated, preferably using matrix linear regression, by comparing the reference color values to the measured reference readings. For example:

$$B=[X^T X]^{-1} X^T Y$$

where X is a 3 by n matrix representing three reference color value readings for each of the n reference samples, and Y is three current readings for each of the n reference samples.

In step 37, the transformation is applied to the average readings of the target area. For example, $$Y=BX$$

where B is the transformation matrix computed in step 36, X is the 3 by 1 matrix with average color values for the target area 24 computed in step 35, and Y is the resulting "corrected" color values for the target area.

Finally, in step 38 the corrected measured color values for the target area are applied according to the requirements of the specific application (e.g., to report a color value, to find the closet matching color, etc.).

Having described the invention in detail and by reference to specific embodiments thereof, it will be apparent the numerous modifications and variations are possible without separating from the spirit and scope of the invention.

What is claimed is:

1. A color measurement device comprising
    a digital recorder for electronically recording a color image,
    a target holder extending from the digital recorder having a distal end,
    a target at the distal end of the holder, the target having one or more reference color regions thereon, and
    a controller programmed with reference color values of the reference color regions.

2. The device of claim 1 wherein the digital recorder is a digital camera.

3. The device of claim 2 wherein there are a plurality of reference color regions on the target.

4. The device of claim 3 wherein the target is a ring and the reference color regions are circumferentially spaced on the ring.

5. The device of claim 2 wherein the camera records color values corresponding to the reference color regions and a target area and the controller is programmed to calculate a transformation based upon the reference color values and the recorded color values corresponding to the reference color regions.

6. The device of claim 5 wherein the controller is programmed to calculate a color value for the target area based on the transformation and the recorded color value for the target area.

7. The device of claim 6 wherein the plurality of reference color regions is at least 3.

8. The device of claim 7 wherein the plurality of reference color regions is at least 6.

9. The device of claim 1 wherein the device additionally includes an illumination source.

10. A process for determining the color of a target area which comprises:
provided a device comprising a means for electronically recording an image having a target areas extending therefrom having one or more reference color regions and a controller programmed with reference color values of the reference color regions,
juxtaposing the target with a target area,
recording an image of the target including the reference color(s) and the target area,
calculating a transform based on color values recorded for the reference colors in the preceding step of recording and the reference color values for the reference colors programmed in the controller,
applying the transform to the recorded color value for the target area to calculate a corrected value for the target area.

11. The method of claim 10 wherein the transformation is calculated using a matrix linear regression.

12. The method of claim 11 wherein the target includes at least 3 reference colors.

13. The method of claim 12 wherein the recorded color values used in calculating the transform are average values.

14. The method of claim 13 wherein the method additionally includes assigning pixel coordinates to the reference color areas whereas the recorded color values are associated with the predetermined color values.

15. The method of claim 12 wherein the target area is facial skin.

16. The method of claim 12 wherein the target area is hair.

17. The device of claim 1 wherein the controller is programmed to calculate a transform based on the programmed reference color values and the color values recorded for the reference colors, and to apply the transform to the recorded color values for the target area to calculate a corrected value for the target area.

* * * * *

UNITED STATES PATENT AND TRADEMARK OFFICE
CERTIFICATE OF CORRECTION

| | |
|---|---|
| PATENT NO. | : 7,057,641 B2 |
| APPLICATION NO. | : 10/736449 |
| DATED | : June 6, 2006 |
| INVENTOR(S) | : Gary Bodnar et al. |

It is certified that error appears in the above-identified patent and that said Letters Patent is hereby corrected as shown below:

Col. 5, Line 8 – Change "areas" to -- area --.

Signed and Sealed this

Twelfth Day of September, 2006

JON W. DUDAS
*Director of the United States Patent and Trademark Office*